Aug. 2, 1966  E. W. ASP ETAL  3,263,795
TURNING MECHANISM

Filed July 24, 1964  3 Sheets-Sheet 3

3,263,795
TURNING MECHANISM
Erik Wilhelm Asp and Rolf Siggesson Lundquist, Hamstad, Sweden, assignors to Sprinter-Pack AB, a corporation of Sweden
Filed July 24, 1964, Ser. No. 384,879
Claims priority, application Sweden, July 26, 1963, 8,315/63
7 Claims. (Cl. 198—35)

This invention relates to a turning mechanism in combination with conveyors for tea portion bags, newspapers and similar relatively flat articles of different thicknesses at their opposite end portions.

The object of the invention is to provide a mechanism of this kind which permits a relatively high working speed. This object is attained by a mechanism according to the invention which is characterized by a step-wise rotatable turret device comprising a plurality of carriers each of which is adapted to carry a pile of articles, said carriers being equally spaced apart along a circle around the vertical axes of rotation of the turret, said piles being transmitted to the turret one after the other at a receiving station located at the path of movement of said carriers and being deposited one after the other at a delivery station upon revolution of the turret through at least one step, every second carrier being fixed on the turret whereas every other carrier is rotatably mounted on the turret and provided with a toothed wheel which directly or indirectly meshes with a stationary toothed path concentric with the axis of rotation of the turret and adapted to impart rotation to the rotatable carriers in a manner such that the rotatable carriers during their movement from the receiving station to the delivery station are rotated half a revolution relative to the next succeeding fixed carrier. If the mechanism is used for turning tea bags and similar small articles the carriers are advantageously in the form of containers which have an openable bottom and are open at the top for receiving a pile of bags for instance from a shaft, on the openable bottom of which a predetermined amount of bags is collected from a conveyor and is then deposited by opening the bottom of the shaft.

A suitable embodiment of the mechanism according to the invention is described herebelow by way of example with reference to the annexed drawings.

Figure 1:
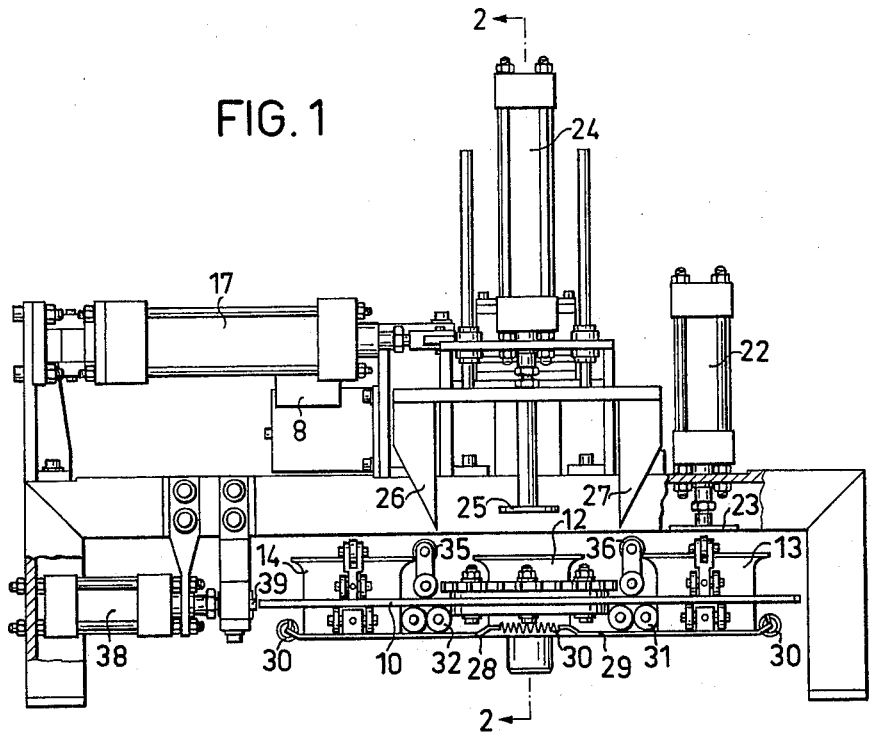
Figure 2:
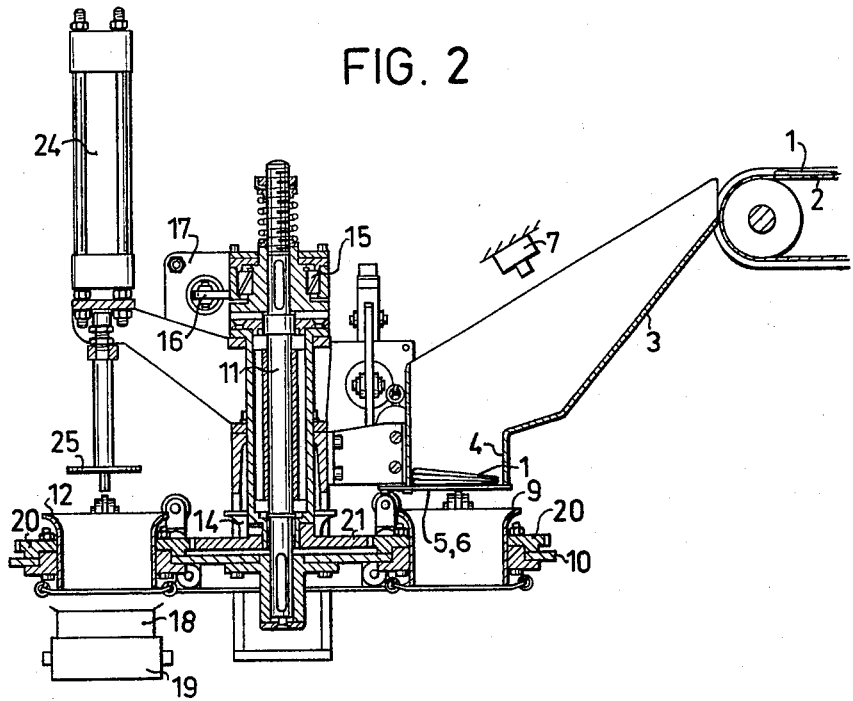
Figure 3:
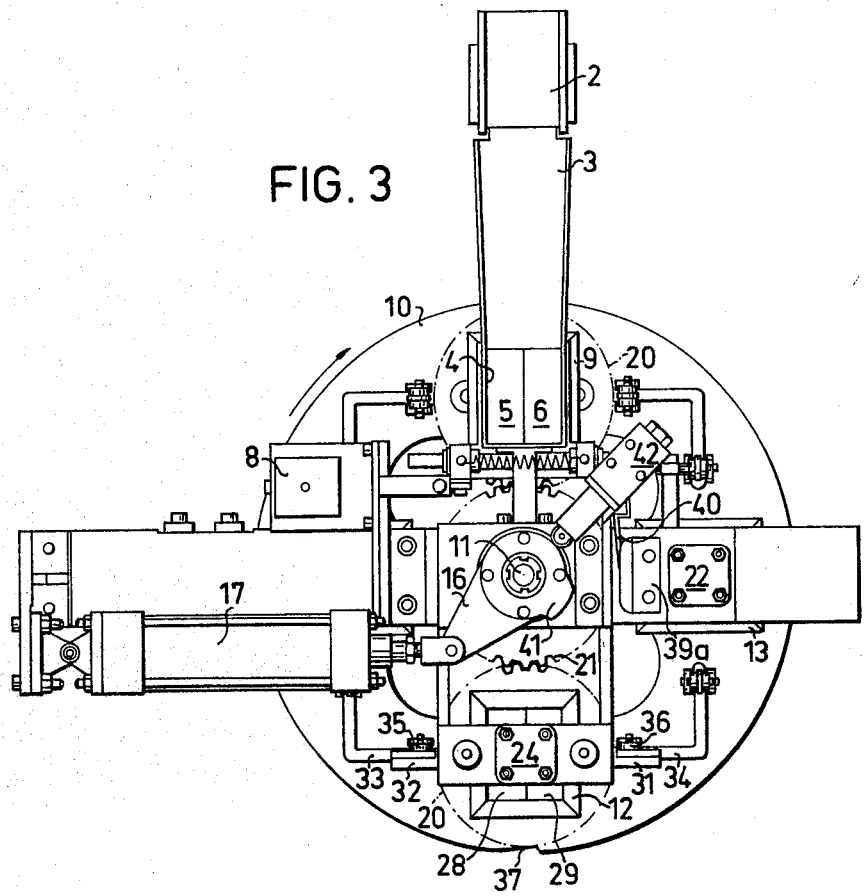

FIG. 1 is a lateral elevation of the turning mechanism according to the invention, FIG. 2 is a sectional view taken on the line 2—2 in FIG. 1, and FIG. 3 is a top view of the mechanism according to FIG. 1.

In the embodiment exemplified the flat articles are to be stacked in cardboard boxes. By way of example the articles consist of tea bags 1 which are supplied to the turning mechanism on a continuously driven band conveyor 2. The bags are facing in the same direction on the conveyor and are advanced at intervals corresponding approximately to the length of a bag.

From the conveyor 2 the bags are discharged into a chute 3 in which they glide down one after another into a shaft 4 the bottom of which consists of two sliding doors 5, 6.

The bags are counted by a photoelectric cell 7 provided near the chute and adapted to operate an electromagnet 8 which in turn opens the doors 5, 6 after a predetermined number of bags, for instance three bags, have glided down into the shaft. Consequently the pile drops from the shaft. Before the next succeeding bag drops into the shaft the doors 5, 6 are closed again whereupon the next pile begins to be formed.

A carrier below the shaft 4 is in the form of a container 9 which is open at the top for receiving a pile from the shaft. The container 9 shown in FIG. 2 below the shaft 4 is rotatably mounted on a disc 10 secured to a vertical rotatable shaft 11. The disc 10 also carries a further rotatably mounted container 12 and two fixed containers 13 and 14. It will be seen that every second container is rotatably mounted on the disc and that every other container is fixed on the disc.

By means of a free-wheel device 15 and a rocking arm 16 the shaft 11 of the disc is connected to a pneumatic piston 17 which upon supply of air under pressure reciprocates so as to move the arm 16 to and fro. When the arm 16 moves back the free-wheel device 15 engages with the result that the shaft 11 and the disc 10 are rotated one step for advancing the empty container 14 to what may be termed the receiving station below the shaft 4. At the same time the container 9 and the pile contained therein are moved to the intermediate position which in FIG. 3 is assumed by the container 12, and the container 12 is moved to what may be termed the delivery station which in FIG. 3 is assumed by the container 14.

At the delivery station the piles are deposited in boxes 18 on a conveyor 19 which is advanced one step after the box at the delivery station has been filled with two superposed piles. The turning mechanism according to the invention is constructed such that the thick ends of the piles in the box will face in opposite directions.

Each of the rotatable containers 9 and 12 is provided with a toothed wheel 20 which in the embodiment illustrated is a gear wheel, but may be a sprocket wheel. The wheels 20 are in mesh with a stationary toothed path in the form of a fixed gear wheel 21 concentric with the shaft 11 of the disc 10. This wheel also may be a sprocket wheel in which case it is connected to the sprocket wheels of the containers by means of endless chains.

In the embodiment illustrated the wheels 20 and 21 are of equal diameters resulting in that the rotatable containers will be rotated half of a revolution relative to the disc 10 when this disc rotates half of a revolution, that is, during the time a rotatable container is moved from the receiving station to the delivery station.

At the intermediate position assumed by the container 13 in FIGS. 2 and 3 there is provided a vertical pneumatic piston 22 associated with a thrust plate 23 adapted upon reciprocating movement of the piston to compress the pile in the container present in the intermedate position.

At the delivery station there is provided a vertical pneumatic piston 24 associated with a thrust plate 25 for ejecting the piles. The piston 24 also carries two vertical wedges 26, 27 adapted to open the bottom doors 28, 29 of the container when positioned at the delivery station. A spring 30 biases the doors to closed position.

The bottom doors 28, 29 of each container are supported by carriages 31, 32 running along guiding slots 33, 34 in the disc 10. Each carriage supports a roller 35 or 36 located above the disc 10. During the downward stroke of the piston 24 the wedges 26, 27 engage the rollers 35, 36 and move the carriages 31, 32 away from each other to open the doors 28, 29. Simultaneously the plate 25 exerts a downward pressure on the pile which consequently drops into the box 18.

To stop the disc in exact position after each revolving step forward there are provided four equally spaced lock recesses 37 in the edge of the disc, one of these recesses 37 being shown in FIG. 3. As will be seen from FIG. 1 the end 39 of the piston rod of a pneumatic piston 38 is adapted to engage the nearest lock recess 37. Prior to the revolving movement of the disc the piston 38 is retracted, but is moved forward again into contact with the edge of the disc when the recess 37 is located freely beside the end 39 of the piston rod.

The movements of the parts of the turning mechanism are controlled in a conventional manner by means of microswitches and electromagnetically operated valves for the air under pressure.

Starting from the position illustrated in the drawings it may be assumed that three bags are piled in the shaft 4 and are to be deposited in the container 9. Consequently, the photoelectric cell 7 will emit an impulse to the magnet 8 for opening the doors 5, 6. In its projected position the magnet 8 actuates a micro-switch 39a by means of an arm 40. The micro-switch in turn actuates a magnetic-operated valve that energizes the piston 17 which makes one reciprocating stroke. The turned on micro-switch also results in that the piston 22, 24 are actuated. Consequently the pile in the container 13 will be compressed, the doors 28, 29 of the door container 12 will be opened, and the pile in the container 12 will be ejected.

Immediately before the piston 17 reaches its front end position a cam 41 on the arm 16 actuates a valve 42 which de-energizes the piston 38 resulting in that the end 39 of the piston rod is withdrawn from the recess 37 in the disc. Due to the shape of the cam 41 the valve 42 is kept open while the piston 17 is reversing at its front end position and during part of the return movement of the piston, consequently the piston 17 has time to rotate the disc 10 some distance before the piston 38 is energized again to force the end 39 of its piston rod to the edge of the disc 10. When the piston 17 has returned to its initial position the disc has been rotated one step and the end 39 of the piston rod enters the next succeeding recess 37. The above described sequence of operations will be repeated after the photoelectric cell has received impulses from three further passing bags.

The conveyor 19 is controlled in response to the rotation of the disc 10 such that the boxes 18 are advanced one step after the disc has been rotated two steps.

In case of small flat articles, such as tea portion bags, it is advantageous as described to use containers having openable bottoms. However, the turning mechanism according to the invention may be used also in case of large flat articles, such as newspapers.

In such case the disc 10 and the containers may be replaced by a rotatably mounted spider having four radial arms each of which carries a platform with a lateral border for a pile of newspapers. Every second platform is rotatably mounted on its arm and is rotated relative to the arm during rotation of the spider for conveying piles of newspapers from a receiving station to a delivering station. The rotatable platforms may be driven in the manner described in connection with the rotatable container or by means of sprocket wheels and endless chains. The piles of newspapers are advantageously supplied by a vertical conveyor having forks for each pile of newspapers. The platforms are devised such that the forks can pass through openings or slots in the platforms and deposit a pile of newspapers on each platform. At the delivery station the piles of newspapers can be lifted from the platform by means of conveyor adpated to be lifted and lowered. If this conveyor is lifted through the slots in the platform the pile of newspapers will be lifted for further transportation thereof. The piles arriving at the turning mechanism are facing in the same direction, whereas every second of the delivered piles have been turned half a revolution, for instance in order to facilitate subsequent stacking of the piles.

We claim:

1. A turning mechanism in combination with conveyors for tea portion bags, newspapers and similar relatively flat articles of different thicknesses at their opposite end portions, characterized by a stepwise rotatable turret device comprising a plurality of carriers each of which is adapted to carry a pile of articles, said carriers being equally spaced apart along a circle around the vertical axes of rotation of the turret, said piles being transmitted to the turret one after the other at a receiving station located at the path of movement of said carriers and being deposited one after the other at a delivery station upon revolution of the turret through at least one step, every second carrier being fixed on the turret whereas every other carrier is rotatably mounted on the turret and provided with a toothed wheel which meshes with a stationary toothed path concentric with the axis of rotation of the turret and adapted to impart rotation to the rotatable carriers in a manner such that the rotatable carriers during their movement from the receiving station to the delivery station are rotated half a revolution relative to the next succeeding fixed carrier.

2. A mechanism as claimed in claim 1, characterized in that a conveyor is adapted to deposit one article after another in a shaft located at the receiving station for forming a pile of articles on the bottom of the shaft, said bottom being located above the path of movement of the carriers and being openable for deposition of the pile on an underlying carrier.

3. A mechanism as claimed in claim 2, characterized in that the carriers consist of containers which are open at the top for receiving each a pile on the container bottom which is openable for deposition of the pile at the delivery station.

4. A mechanism according to claim 3 characterized in that an ejector comprising a piston is provided at the delivery station above the path of movement of the carriers, said piston being adapted during its downward stroke to actuate means for opening the bottom of the underlying container and thereupon to force the pile out of the container.

5. A mechanism according to claim 1 characterized by four carriers, the rotatable carriers being provided each with a gear wheel in mesh with a stationary central gear wheel the diameter of which is equal to the diameters of the gear wheels of the carriers, the receiving station and the delivery station being located diametrically opposite each other.

6. A mechanism according to claim 3 characterized in that each container is stopped in an intermediate position between the receiving station and the delivery station and that in said position there is provided a vertically acting striking device located above the path of movement of the containers and adapted by means of a thrust piston to exert pressure on the pile in the container so as to compress the pile to a reduced height.

7. A mechanism as claimed in claim 1 characterized in that the turret is rotatable by means of a pneumatic piston connected to a rocking arm which in turn by means of a free-wheel device is connected to the shaft of the turret for advancing the carriers one after another to the receiving station during each reciprocating stroke of the pneumatic piston.

References Cited by the Examiner

UNITED STATES PATENTS 1,535,031   4/1925   Nevins _____ 214—6.5

EVON C. BLUNK, *Primary Examiner.*

EDWARD A. SROKA, *Examiner.*